United States Patent [19]

Joanides

[11] Patent Number: 5,222,827
[45] Date of Patent: Jun. 29, 1993

[54] FASTENER INSTALLATION AND METHOD FOR COMPOSITE MEMBERS

[75] Inventor: Jack C. Joanides, Rancho Palos Verdes, Calif.

[73] Assignee: Northrop Corporation, Hawthorne, Calif.

[21] Appl. No.: 846,189

[22] Filed: Mar. 4, 1992

[51] Int. Cl.⁵ .............................................. F16B 21/00
[52] U.S. Cl. ................................ 403/408.1; 403/388; 411/82; 411/258
[58] Field of Search .................. 403/408.1, 388, 265, 403/266; 411/258, 82, 930; 52/787

[56] References Cited

U.S. PATENT DOCUMENTS

| | | | |
|---|---|---|---|
| 3,469,490 | 9/1969 | Pearce, Jr. | 85/1 |
| 3,835,615 | 9/1974 | King, Jr. | 52/758 |
| 4,010,519 | 3/1977 | Worthing | 24/141 |

FOREIGN PATENT DOCUMENTS

1455235  11/1976  United Kingdom ................ 353/403

*Primary Examiner*—Randolph A. Reese
*Assistant Examiner*—Christopher J. Novosad
*Attorney, Agent, or Firm*—Terry J. Anderson; Robert B. Block; Karl J. Hoch, Jr.

[57] ABSTRACT

A fastener installation for securing a composite member to a structure. The fastener installation includes a shear member adhesively bonded to a surface of the composite member, and a pin member extending through the shear member and composite member to engage a fastener bore of a structure member and a securing member. The pin member engages a bearing surface of the shear member in bearing contact, and extends through an opening in the composite member spaced from the composite member. Shear forces are transferred between the composite member and the pin member through the adhesive bond, the shear member, and the bearing surface, rather than by bearing contact between the pin member and the composite member. An end of the pin member engages the securing member and acts in cooperation with a head of the pin member to apply compressive force to the composite member, thereby securing the composite member to the structure.

20 Claims, 6 Drawing Sheets

FASTENER INSTALLATION AND METHOD FOR COMPOSITE MEMBERS

BACKGROUND OF THE INVENTION

1. Field of the Invention

This invention relates to a fastener installation and method for a composite member and, more particularly, to a fastener installation and method in which a shear member is adhesively bonded to the composite member and a pin member extends through the shear member and an aligned opening of the composite member.

2. Background Information

Structures, as for example airframes, are formed by fastening members together. In past years, refinements have been made in the materials used for such fastener joints, and interference fit fasteners, bushings, inserts, tension pre-loads, and adhesives have been used to advance the fastener art.

For example, in U.S. Pat. No. 3,469,490, an adhesive is forced into spaces between the fastener head, shank, and the workpiece layers as the fastener is tightened. The adhesive bonds the fastener to the structure, and precludes non-destructive disassembly of the workpiece.

In U.S. Pat. No. 3,835,615, a sleeve is bonded in place in a fastener hole. Forces are transmitted through bearing contact between a fastener shank, the sleeve, and the workpiece. The fastener may be removed, but the sleeve remains bonded in place and thus precludes non-destructive disassembly of the workpiece.

In U.S. Pat. No. 4,010,519, metal plates are bonded to surfaces of a composite member. A shank extending through the member is also bonded to the member, and has a central hole for receiving a fastener. Forces are transmitted in bearing between fastener, shank, and fibers of the composite member.

In British Patent 1 455 235, an insert has a shank cemented in the fastener hole of a fibrous material, and a head portion cemented in a recess in a surface of the member. The insert is said to overcome fastener hole deformation caused by vibration stress on inserts. The insert is also said to transmit two-thirds of the shear forces through the shank portion and one-third through the head portion. Substantial shear forces remain transmitted in bearing to the fibrous material.

Combinations of adhesive bonds and fasteners have produced stronger and more reliable fastener joints in metal structures. Faying surfaces of such structures, i.e., opposing surfaces of adjacent members, are bonded together for shear resistance and fasteners such as bolts or rivets extend through the members to secure the members together against tension or peeling forces.

In recent years, the need for high strength, light weight airframes has led to an increased use of structural members formed of fiber-reinforced composite materials. The use of fasteners and faying surface adhesive bonds has been readily adapted to the permanent joints of such structures. In such joints, the limited strength of the composite member in bearing is replaced with the very stiff and strong shear strength of the faying surface adhesive bond.

However, many fastener joints must allow disassembly and reassembly of the structure so that a member or piece of equipment within the structure can be removed, inspected, repaired, or replaced. Faying surface adhesive bond techniques have not heretofore been satisfactorily applied to these kinds of fastener joints because of the need to periodically open and close the fastener joint.

A further problem in securing composite members is that, in typical flush mounted single shear overlap joints, a countersunk pin member extends through the overlapping members and engages the fibers of the composite members in bearing contact to transfer shear loads. Additionally, moment forces from the offset shear loads applied by the composite members bend the pin member, and the head of the pin member gouges into the composite member and buckles and delaminates the plies of the composite member, reducing the strength of the fastener joint. Fastener hole deformation also occurs in such joints from loads applied to bushings or inserts loosened by vibration and other stresses. Eventually, the fastener joint becomes irreparable, and the damaged composite member must be replaced at significant cost and with substantial "down time."

Moreover, the yielding of composite material in tension or compression is negligible. While metallic members can develop full static strength in regions between fastener holes because the ductility of the metal produces a benign stress concentration profile, the high stress concentrations at fastener holes in composite members result in significant static strength reductions for such members as compared to metallic members. Lastly, if the number of fasteners used in composite structures can be minimized, costs can be reduced.

Consequently, the stronger a composite fastener installation can be made, the more likely it is that a composite structure will withstand unanticipated shear loads without damage or failure.

It is therefore an objective of this invention to provide a high-strength fastener installation for composite members which eliminates bearing loads upon the fibers of the composite members, which enables disassembly and reassembly of the structure for inspection, repair, removal, or replacement of members or internal equipment, which increases the static strength of fastener joints in composite members, and which reduces the costs of composite structures. It is another objective of the invention to provide a method for securing composite members to other members which overcomes the difficulties and problems discussed above.

SUMMARY OF THE INVENTION

The foregoing problems and others are overcome, and the objectives of the present invention are realized by the fastener installation and method disclosed herein, in that a shear member is adhesively bonded to a composite member of a structure and engages a pin member extending through a bearing surface of the shear member and through an aligned opening of the composite member for transfer of shear forces. The pin member engages the shear member in bearing contact within its bearing surface, but is spaced from the composite member within the opening. Shear loads and forces are transferred between the composite member and the shear member by the adhesive bond and between the shear member and the pin member by the bearing contact, rather than by bearing contact between the pin member and fibers of the composite member.

DETAILED DESCRIPTION OF THE PREFERRED EMBODIMENTS

Figure 1A:
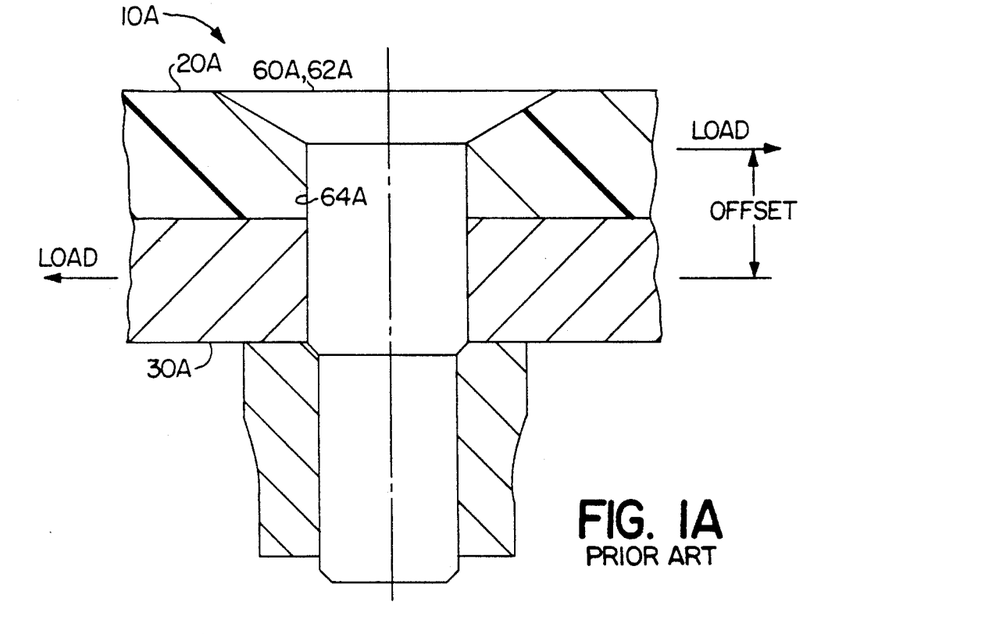
FIG. 1A is a sectional view of a baseline installation of the prior art.

Shown in FIG. 1A is a fastener installation according to the prior art securing together composite member 20A and structure member 30A of structure 10A. Head 62A and shank 64A of pin member 60A engage composite member 20A in bearing contact to transfer applied loads. Moment forces from the offset shear loads applied by the composite members cause pin member 60A to bend such that the tip of head 62A gouges the outer plies of composite member 20A, which reduces the strength of the fastener joint.

Figure 1B:
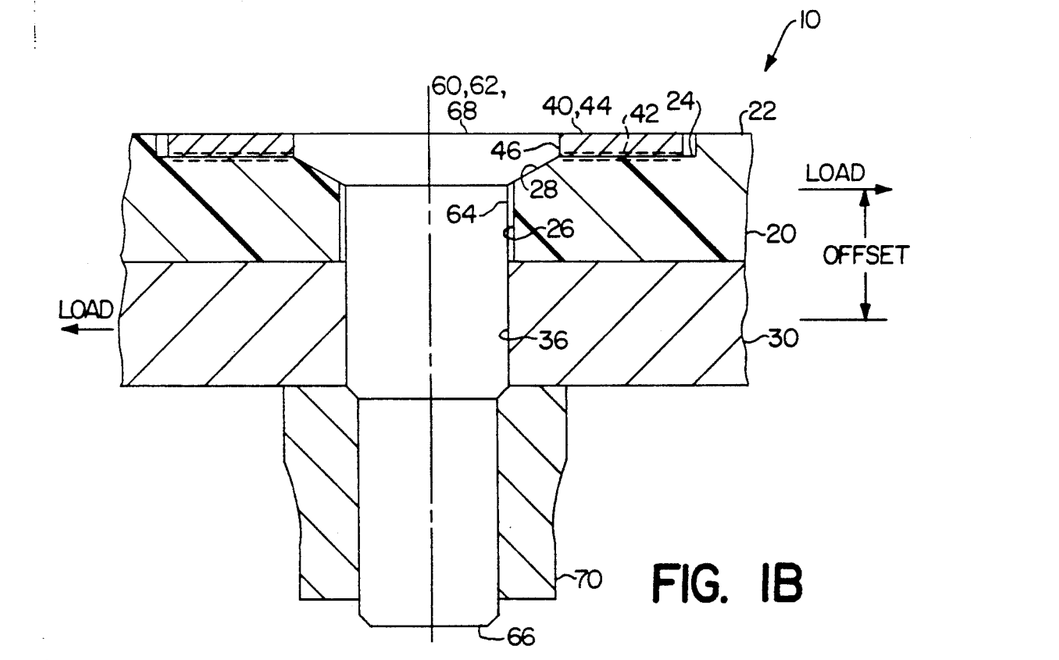
FIG. 1B is a sectional view of a preferred embodiment of the present invention.

Shown in FIG. 1B is a fastener installation according to the present invention securing together composite member 20 and structure member 30 of structure 10. Composite member 20 includes exterior surface 22 opposite from structure member 30, recess surface 24 formed in exterior surface 22 opposite from structure member 30 for receiving shear member 40 therein, cylindrically shaped opening 26 extending through composite member 20, and conical surface 28 axially aligned with opening 26. Conical surface 28 connects opening 26 with recess surface 24 for receiving head 62 of pin member 60 in countersunk fashion.

Shear member 40 is adhesively bonded to recess surface 24 by adhesive bond 42. Shear member 40 includes cylindrically shaped bearing surface 46 in general axial alignment with opening 26 and extending through shear member 40. In the preferred embodiment, a diameter of bearing surface 46 is greater than a diameter of opening 26. A depth of recess surface 24 and a thickness of shear member 40 are selected such that outer surface 44 of shear member 40 is flush with exterior surface 22 of composite member 20.

Structure member 30 includes cylindrically shaped fastener bore 36 axially aligned with bearing surface 46. A diameter of fastener bore 36 is less than the diameter of opening 26.

Pin member 60 extends through shear member 40, composite member 20, and structure member 30 within bearing surface 46, opening 26, and fastener bore 36, respectively. Pin member 60 comprises cylindrically shaped head 62, cylindrically shaped shank 64 extending away from head 62 through composite member 20 and structure member 30, and cylindrically shaped end 66 engaging securing means 70, shown in the present embodiment as a conventional nut.

Head 62 has a diameter equal to the diameter of bearing surface 46 and engages bearing surface 46 in bearing contact. Head 62 is further shaped for conforming contact with conical surface 28 upon proper engagement of end 66 with securing means 70. Shank 64 has a diameter equal to the diameter of fastener bore 36 and is therefore spaced from composite member 20 within opening 26, but engages fastener bore 36 in bearing contact.

Upon proper engagement of end 66 with securing means 70, shear loads are transmitted between composite member 20 and shear member 40 through adhesive bond 42 and between shear member 40 and pin member 60 by bearing contact between bearing surface 46 and head 62, rather than by bearing contact between pin member 60 and composite member 20. Shear loads are transferred between pin member 60 and structure member 30 by bearing contact between shank 64 and fastener bore 36.

Also upon proper engagement of end 66 with securing means 70, head 62 contacts conical surface 28 and securing means 70 contacts structure member 30 in cooperative action with head 62 to apply compressive force securing composite member 20 and structure member 30 together with head surface 68 of pin member 60 being flush with exterior surface 22 and outer surface 44. No shear forces are transferred between head 62 and conical surface 28 because head 62 is restrained by the stiffer load path provided by the bearing contact between head 62 and bearing surface 46. Moment forces produced by the offset shear loads are opposed by the bearing contact between head 62 and bearing surface 46, which substantially precludes bending of pin member 60 and prevents head 62 from gouging into plies of composite member 20.

Shear member 40 and pin member 60 are comprised of a material having high strength in bearing, such as a metal or alloy or material of comparable strength. In a preferred embodiment, shear member 40 and pin member 60 are comprised of titanium alloy (6Al-4V, annealed). In the preferred embodiment, adhesive bond 42 is formed of an epoxy film adhesive such as FM-300k available commercially from American Cyanamid.

Figure 2:
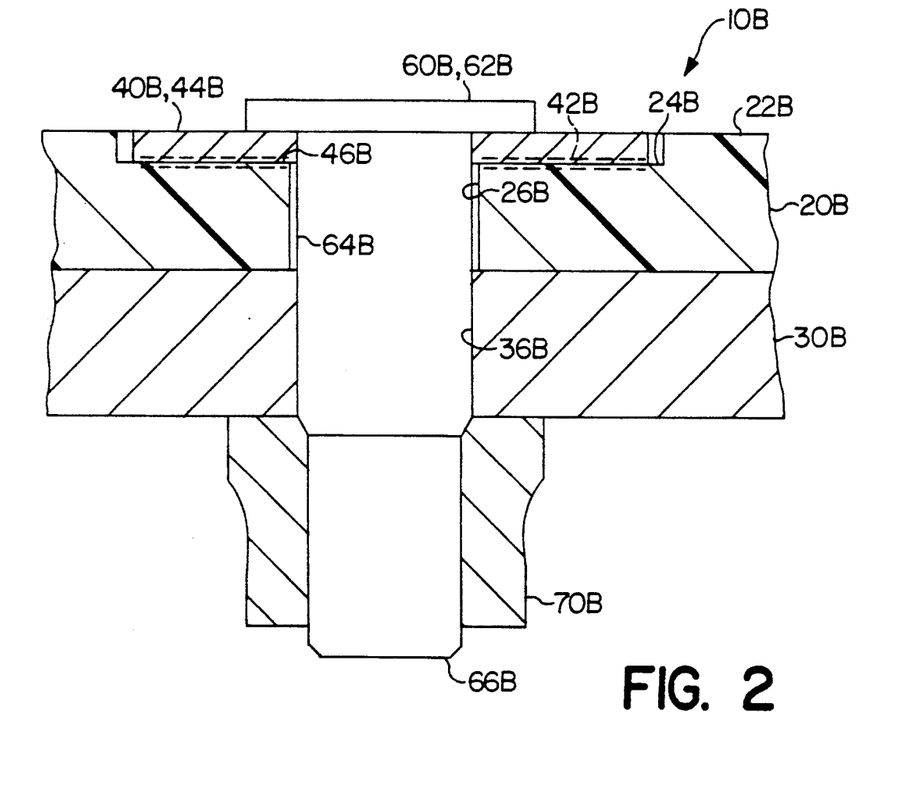
FIG. 2 is a sectional view of an alternate embodiment of the present invention.

In FIG. 2 is shown a sectional view of structure 10B in which an alternate embodiment of the present invention is used to secure composite member 20B and structure member 30B to each other.

In the alternate embodiment of FIG. 2, composite member 20B includes exterior surface 22B, recess surface 24B, and cylindrically shaped opening 26B as in the preferred embodiment. Similarly, shear member 40B is adhesively bonded to recess surface 24B by adhesive bond 42B, also as in the preferred embodiment. In the alternate embodiment, opening 26B extends continuously through composite member 20B from recess surface 24B, and bearing surface 6B has a diameter less than a diameter of opening 26B and equal to the diameter of the fastener bore.

Shank 64B of pin member 60B thus extends through shear member 40B in bearing contact with bearing surface 46B. As in the preferred embodiment, shank 64B extends through composite member 20B spaced from composite member 20B within opening 26B and engages fastener bore 36B of structure member 30B in bearing contact with end 66B of pin member 60B engaging securing means 70B.

Upon proper engagement of end 66B with securing means 70B, shear forces are transmitted between composite member 20B and shear member 40B through adhesive bond 42B and between shear member 40B and pin member 60B by bearing contact between bearing surface 46B and shank 64B, rather than by bearing contact between pin member 60B and fibers of composite member 20B. Shear loads are transferred between pin member 60B and structure member 30B by bearing contact between shank 64B and fastener bore 36B.

Also upon proper engagement of end 66B with securing means 70B, head 62B of pin member 60B contacts outer surface 44B of shear member 40B opposite from structure member 30B and securing means 70B contacts structure member 30B to apply compressive force to secure composite member 20B and structure member 30B together. Moment forces produced by the offset shear loads are opposed by bearing contact between shank 64B and bearing surface 46B.

Variations and combinations of the above embodiments will be apparent to those skilled in the art.

Figure 3:
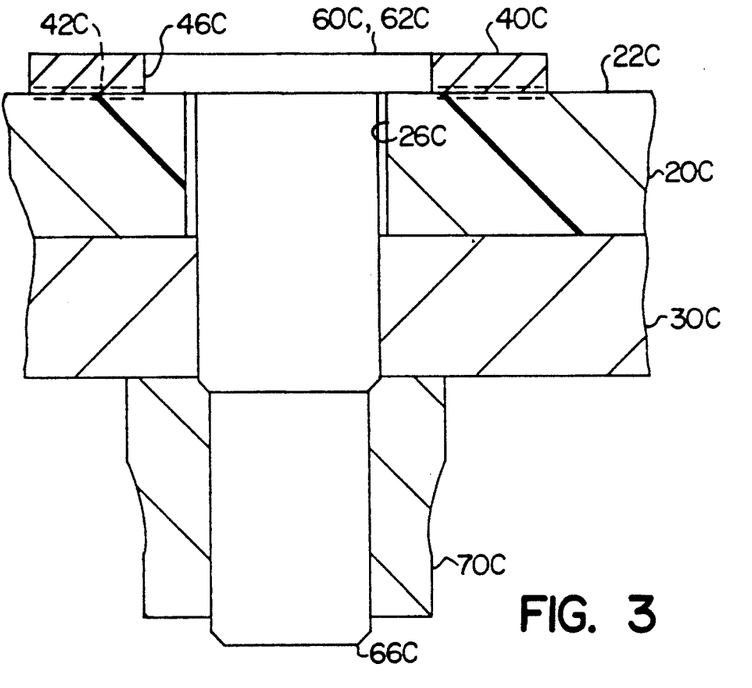
FIG. 3 is a sectional view of a variation of the preferred embodiment of the present invention.

For example, in FIG. 3 there is shown a variation of the preferred embodiment in which shear member 40C is adhesively bonded to exterior surface 22C of composite member 20C opposite from structure member 30C. Opening 26C extends fully through composite member 20C. Shear forces are transferred between head 62C of pin member 60C and composite member 20C through bearing surface 46C, shear member 40C, and adhesive bond 42C. Upon proper engagement of end 66C of pin member 60C and securing means 70C, head 62C contacts exterior surface 22C of composite member 20C to secure the members together. Moment forces produced by the offset shear loads are opposed by bearing contact between head 62C and bearing surface 46C.

Figure 4:
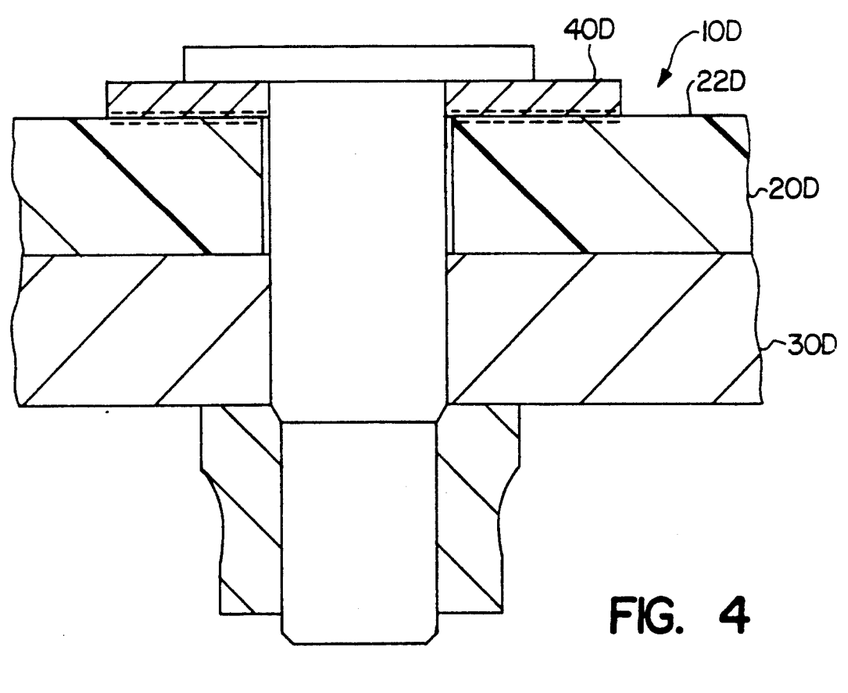
FIG. 4 is a sectional view of a variation of an alternate embodiment of the present invention.

Similarly, in FIG. 4 there is shown a variation of the alternate embodiment in which shear member 40D is adhesively bonded to exterior surface 22D of composite member 20D of structure 10D opposite from structure member 30D. Shear forces are transferred, and the members are secured together, as discussed for the alternate embodiment.

Figure 5:
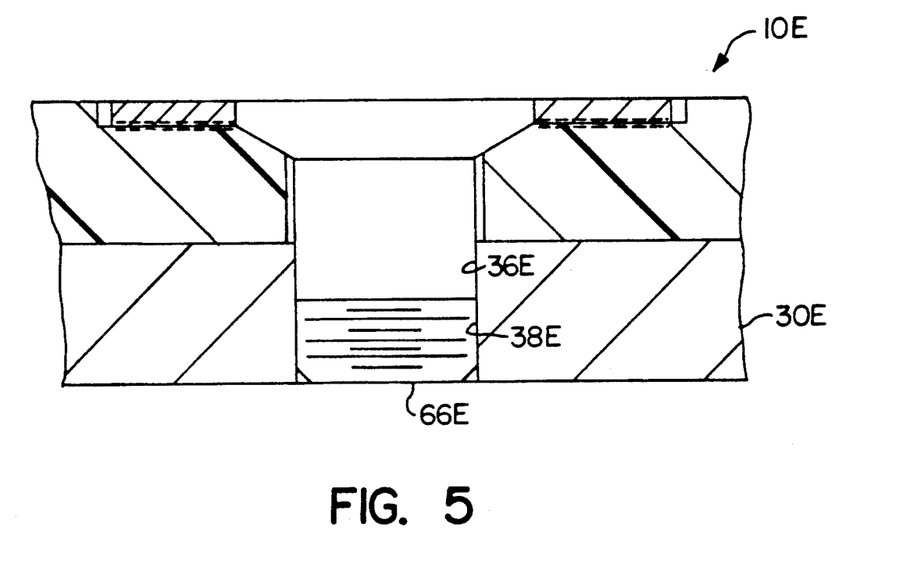
FIG. 5 is a sectional view of the present invention, in which the securing means comprises a threaded bore.

In FIG. 5 is shown a variation of the invention in which the securing means comprises threaded bore 38E of structure member 30E of structure 10E axially aligned with fastener bore 36E of structure member 30E. End 66E of pin member 60E engages threaded bore 38E to secure the members together.

Figure 6:
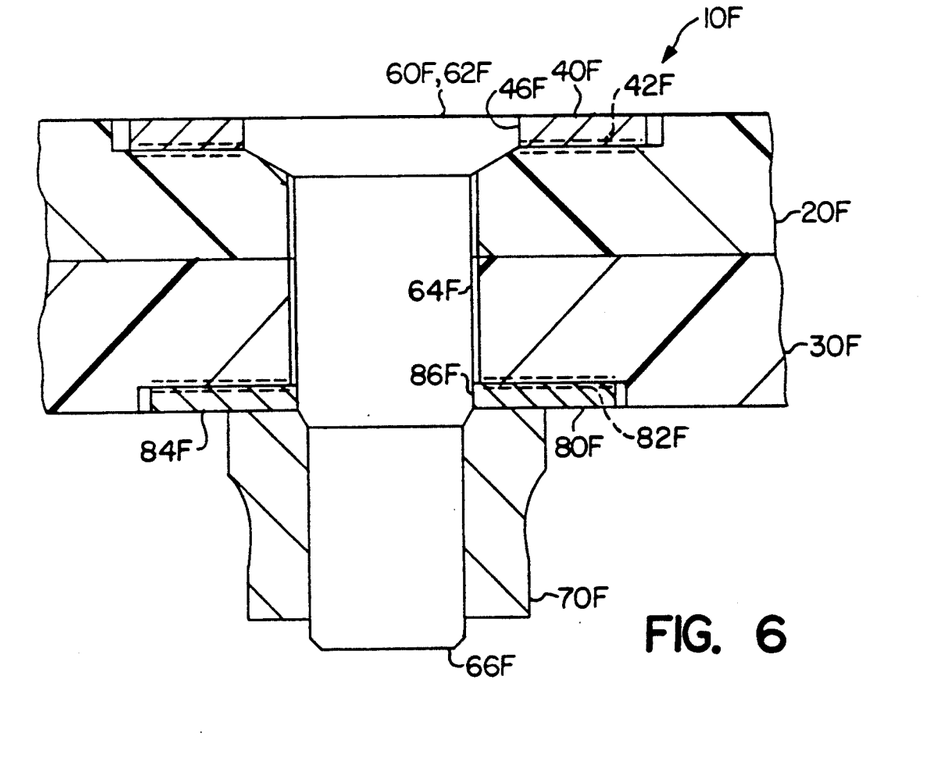
FIG. 6 is a sectional view of embodiments of the present invention used in combination to secure two composite members together.

In FIG. 6 there is shown structure 10F in which a preferred embodiment and an alternate embodiment are applied in combination to secure exterior composite member 20F and interior composite member 30F together. Exterior composite member 20F incorporates a preferred embodiment of the invention, so that shear forces are transferred between head 62F of pin member 60F and exterior composite member 20F through exterior bearing surface 46F, exterior shear member 40F, and exterior adhesive bond 42F. Interior composite member 30F incorporates an alternate embodiment of the invention, so that shear forces are transferred between shank 64F of pin member 60F and interior composite member 30F through interior bearing surface 86F, interior shear member 80F, and interior adhesive bond 82F. Upon proper engagement of end 66F of pin member 60F and securing means 70F, head 62F contacts conical surface 28F of exterior composite member 20F, and securing means 70F contacts lower surface 84F of interior shear member 80F, to secure the members together. Moment forces produced by the offset shear loads are opposed by bearing contact between head 62F and exterior bearing surface 46F, and between shank 64F and interior bearing surface 86F.

Figure 7:
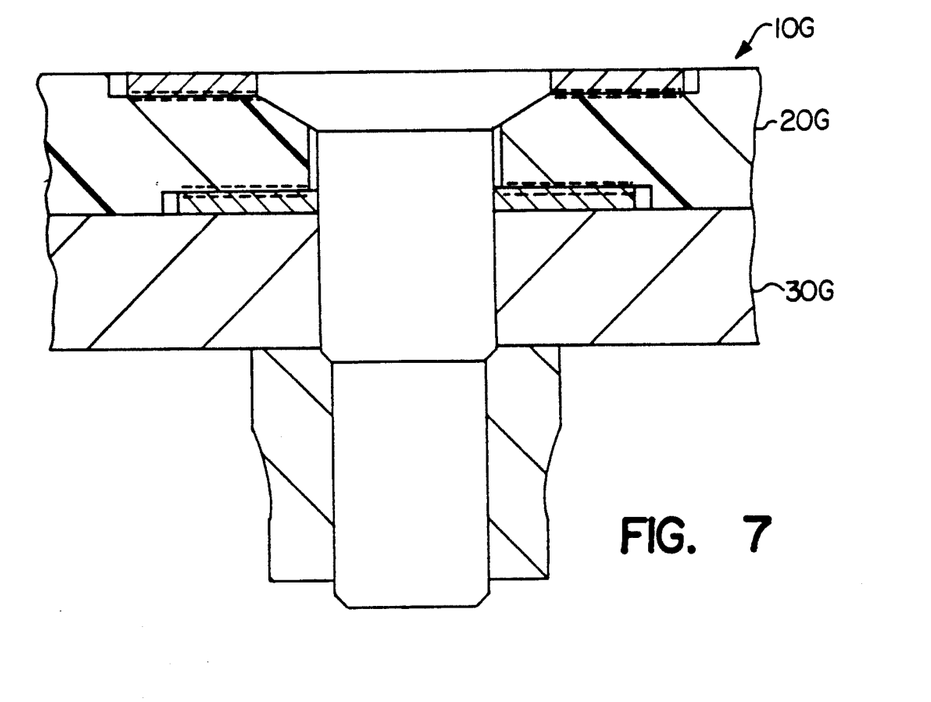
FIG. 7 is a sectional view of embodiments of the present invention used in combination to provide increased shear resistance.

In FIG. 7 is shown a variation of the invention in which composite member 20G is secured to structure member 30G of structure 10G by a fastener installation in accordance with the preferred embodiment of the present invention. Additionally, composite member 20G includes a second shear member in accordance with the alternate embodiment of the present invention to provide increased resistance to shear loads. Shear forces are transferred between composite member 20G and pin member 60G through two load paths rather than one, providing increased resistance to shear loads.

Figure 8:
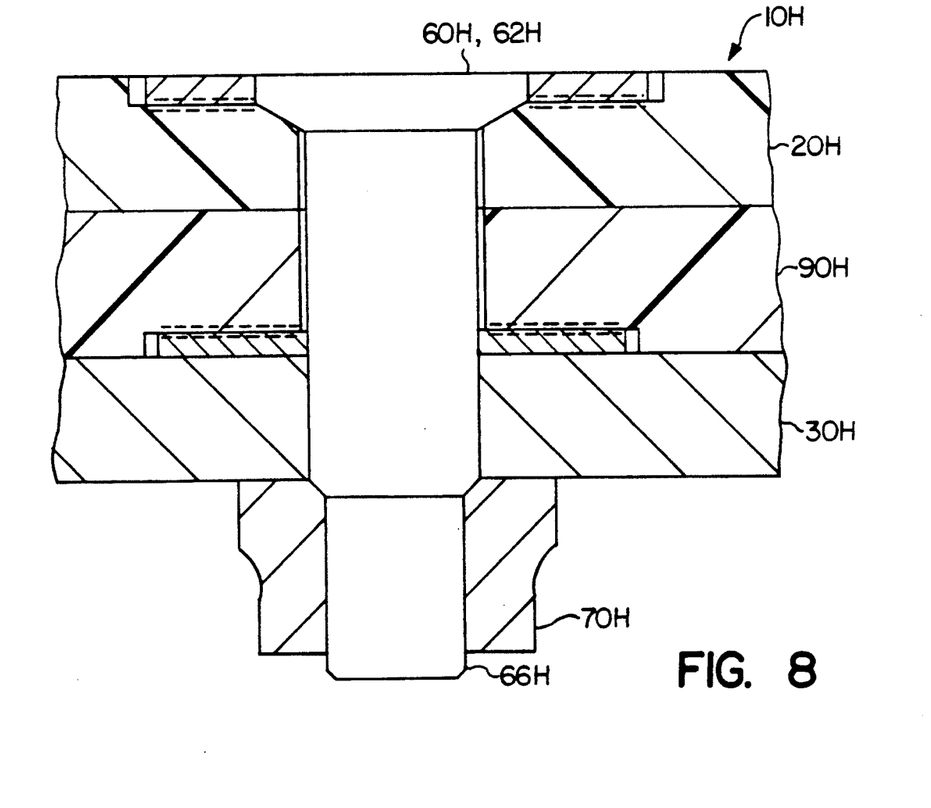
FIG. 8 is a sectional view of embodiments of the present invention used in combination to secure an exterior and an interior composite member to a structure.

In FIG. 8 is shown exterior composite member 20H secured in structure 10H by in accordance with the preferred embodiment of the present invention. Intermediate composite member 90H is secured to structure 10H between exterior composite member 20H and structure member 30H in accordance with the alternate embodiment of the present invention. Upon proper engagement of end 66H of pin member 60H with securing means 70H, head 62H contacts exterior composite member 20H and securing means 70H contacts structure member 30H to apply compressive force to secure the members together with intermediate composite member 90H being secured therebetween.

In other embodiments, individual shear members for each fastener installation may be replaced by shear members having a plurality of bearing surfaces formed therein. Such shear members facilitate the manufacture of structures by eliminating the need to locate and secure individual shear members at fastener locations, and are particularly advantageous for use where many fasteners must be placed along a particular seam or joint line, or where many fasteners must be located in a confined area.

Figure 9:
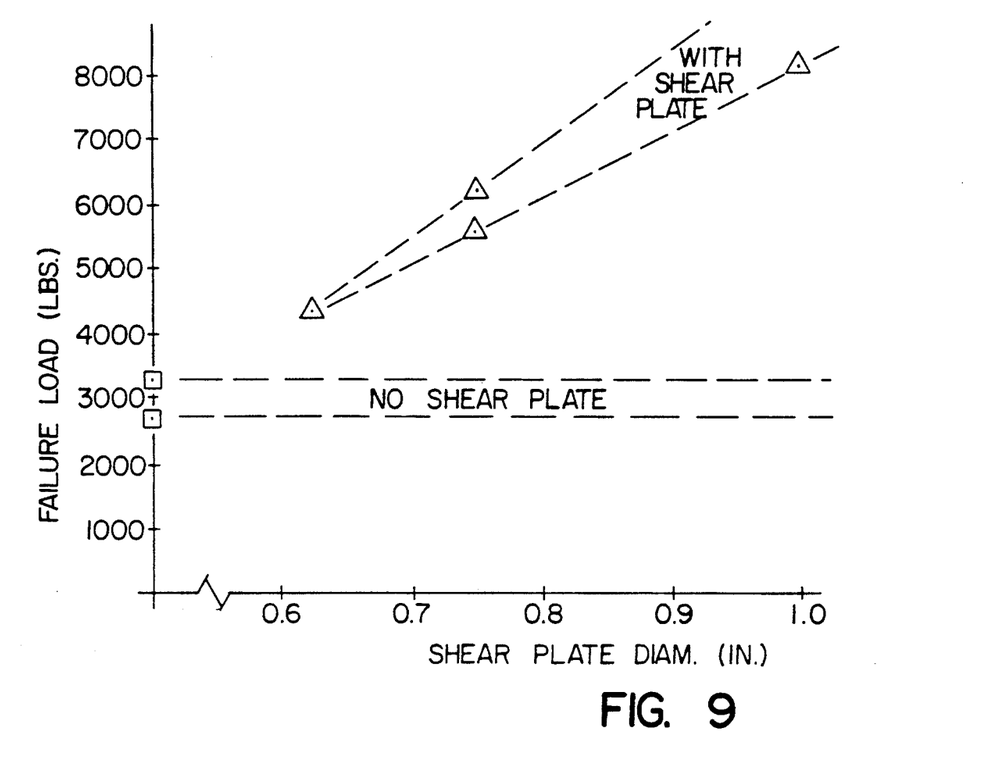
FIG. 9 is a graph of test results showing the increased strength of the present invention over the prior art.

As shown in FIG. 9, the present invention significantly increased the test strength of fastener installations in composite structures. The tests used a steel clevis fitting that applied tension loads to the composite member through a single pin member and two shear members bonded to opposing surfaces of the composite member. The shear members were titanium plates approximately 0.030 inches thick and having outside diameters of 0.625 inches, 0.750 inches, and 1.00 inches, and were bonded to opposing surfaces of composite members approximately 0.177 inches thick. Tension loads were applied through a titanium pin member having a ¼-inch diameter shank extending through the shear members and composite members. Failure loads were increased from approximately 3000 pounds, where no shear member was used, to over 4000 pounds where an ⅝-inch diameter shear member was bonded to the specimen, and to almost 8000 pounds where a 1-inch diameter shear member was used.

Figure 10:
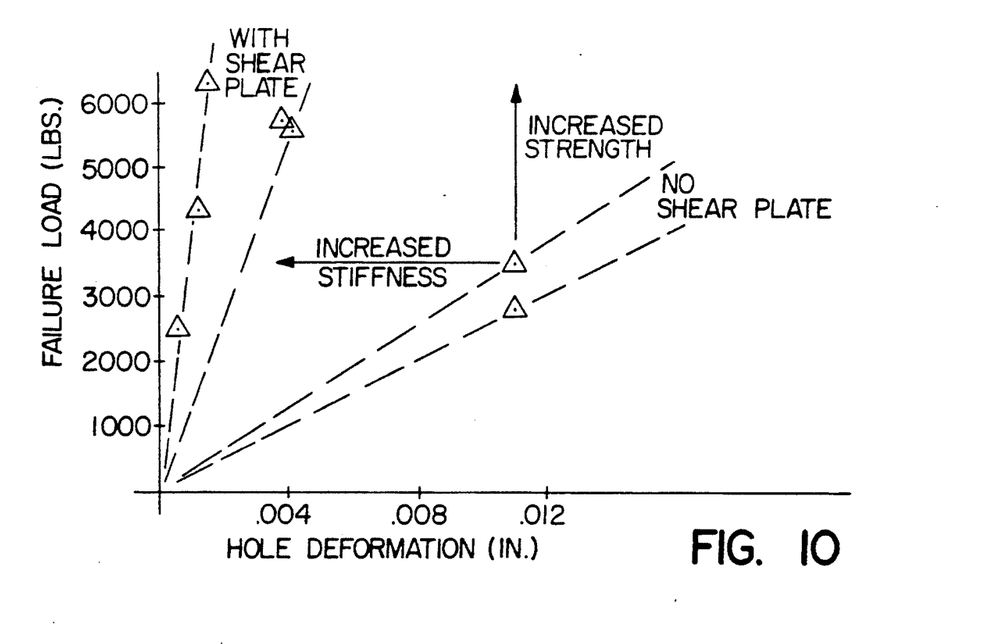
FIG. 10 is a graph of the test results showing the increased rigidity of the present invention over the prior art.

As shown in FIG. 10, the present invention also significantly improves rigidity of composite fastener installations. For loads of 3000 pounds, deformation (the difference between dimensions of a deformed fastener hole in the direction of the applied load and the direction transverse thereto) of a fastener hole of a conventional composite fastener installation is some 0.011 inches, while for a fastener installation of the invention as described above, hole deformation for a 6000-pound load is less than 0.004 inches.

The present invention additionally significantly increases the by-pass strength of composite members with fastener holes. This by-pass strength was evaluated by compression tests of holed specimens with and without the adhesive bonded shear members embodied by the present invention. The compression strength was 40% greater for the specimens incorporating the present invention than for those without it.

The invention may also be incorporated into a method for securing a composite member to a structure.

In a preferred embodiment, the method includes a step of forming a cylindrically shaped bearing surface extending through a shear member. The method further includes: a step of forming, at a selected location of the composite member, a recess surface in an exterior surface of the composite member determined to be opposite from a structure member when the composite member is secured to the structure; a step of forming a cylindrically shaped opening extending through the composite member; and, a step of forming a conical surface axially aligned with the opening and extending from the opening to the recess surface.

The location of the recess surface, opening, and conical surface is selected such that the opening and conical surface are in general axial alignment with a cylindrically shaped fastener bore of the structure member upon proper positioning of the composite member for being secured to the structure. The recess surface has a depth associated with a thickness of the shear member such that an outer surface of the shear member opposite from the structure member is flush with the exterior surface of the composite member when the shear member is adhesively bonded to the recess surface. In the preferred embodiment, a diameter of the bearing surface is greater than a diameter of the opening, and the diameter of the opening is greater than a diameter of the fastener bore.

The method further includes: a step of adhesively bonding the shear member to the recess surface with the bearing surface being in general axial alignment with the opening; a subsequent step of positioning the composite member and shear member bonded thereto in place for being secured to the structure, with the bearing surface being in axial alignment with the fastener bore; and, a further subsequent step of extending a pin member through the shear member, the composite member, and the structure member for engagement with the fastener bore and a securing means.

Upon proper engagement of the pin member with the securing means, a cylindrical head of the pin member engages the bearing surface in bearing contact, and a cylindrical shank of the pin member extends through the composite member spaced from the composite member within the opening and engages the fastener bore in bearing contact. Shear forces are thereby transferred between the composite member and the pin member through the adhesive bonding, the shear member, the bearing surface, and the head of the pin member, and not by bearing contact between the pin member and the composite member. Shear forces are transferred between the pin member and the structure member by bearing contact between the shank and the fastener bore. The head of the pin member contacts the conical surface and the securing means contacts the structure member to apply compressive force securing the members together. The head of the pin member engages the bearing surface in bearing contact to oppose moment forces produced by the offset shear loads.

In an alternate embodiment, the method includes a step of forming a cylindrically shaped bearing surface extending through a shear member. The method further includes a step of forming, at a selected location of the composite member, a recess structure in an exterior surface of the composite member determined to be opposite from a structure member when the composite member is secured to the structure, and a step of forming a cylindrically shaped opening extending through the composite member to the recess surface.

The location of the recess surface and opening is selected such that the opening is in axial alignment with a cylindrically shaped fastener bore of the structure member upon proper positioning of the composite member for being secured to the structure. In the alternate embodiment, a diameter of the bearing surface is less than a diameter of the opening and equal to a diameter of the fastener bore. The recess surface has a depth such that an outer surface of the shear member opposite from the structure member is flush with the exterior surface of the composite member when the shear member is adhesively bonded to the recess surface.

The method of the alternate embodiment further includes: a step of adhesively bonding the shear member to the recess surface with the bearing surface being in general axial alignment with the opening; a subsequent step of positioning the composite member and shear member bonded thereto in place for being secured to the structure, with the bearing surface being in axial alignment with the fastener bore; and a further subsequent step of extending a pin member through the shear member, the composite member, and the structure member for engagement with the fastener bore and a securing means.

Upon proper engagement of the pin member with the securing means, a cylindrically shaped shank of the pin member engages the bearing surface and fastener bore in bearing contact, and extends through the composite member spaced from the composite member within the opening. Shear forces are thereby transferred between the composite member and the pin member through the adhesive bonding, the shear member, the bearing surface, and the shank of the pin member, and not by bearing contact between the pin member and the composite member. Shear forces are transferred between the pin member and the structure member by bearing contact between the shank and the fastener bore.

Also upon proper engagement of the pin member with the securing means, the head of the pin member contacts an outer surface of the shear member opposite from the structure member, and the securing means contacts the structure member to apply compressive force securing the members together. The shank of the pin member engages the bearing surface in bearing contact to oppose moment forces produced by the offset shear loads.

The invention may be incorporated into variations of the foregoing methods where, for example, the shear member is bonded to an exterior surface of the composite member, rather than to a recessed surface. Embodiments of the method of the invention may be used singly or in combination such as to provide increased resistance to shear forces, or to secure a plurality of composite members to a structure. The method may be incorporated into a shear member which engages a single pin member, or into a shear member which engages a plurality of pin members.

While the invention has been described in detail with reference to preferred embodiments thereof, it will be understood that variations and modifications thereof, such as those discussed above and others, may be made without departing from the scope and spirit of the invention as set forth in the following claims.

What is claimed is:

1. A fastener installation for securing a composite member to a structure, comprising:
    a shear member adhesively bonded to a surface of the composite member, the shear member having a cylindrically shaped bearing surface extending therethrough in general axial alignment with a cylindrically shaped opening extending through the composite member, the bearing surface being in axial alignment with a cylindrically shaped fastener bore of a structure member upon proper positioning of the composite member for being secured to the structure;
    a pin member extending through the shear member and the cylindrically shaped opening in the composite member, the pin member engaging the shear member in bearing contact with the bearing surface, and being, spaced from the composite member within the cylindrically shaped opening, and engaging the structure member in bearing contact with the fastener bore; and,
    securing means engaging an end of the pin member for applying compressive force to the composite member in cooperative action with a head of the pin member whereby shear forces are transferred between the structure member and the composite member through the pin member engaging the bearing surface of the shear member while avoiding bearing contact between the pin member and the composite member.

2. A fastener installation as claimed in claim 1, wherein:
    a diameter of the bearing surface is greater than a diameter of the cylindrically shaped opening;
    the diameter of the cylindrically shaped opening is greater than a diameter of the fastener bore;
    the head of the pin member engages the shear member in bearing contact with the bearing surface;
    a shank of the pin member is spaced from the composite member within the cylindrically shaped opening; and,
    the shank engages the structure member in bearing contact with the fastener bore.

3. A fastener installation as claimed in claim 2, wherein further:
    the surface of the composite member is a recess surface of an exterior surface of the composite member opposite from the structure member;
    a depth of the recess surface is selected such that an outer surface of the bonded shear member is flush with the exterior surface;
    a conical surface axially aligned with the cylindrically shaped opening extends between the cylindrically shaped opening and the recess surface; and,
    the head of the pin member further engages the conical surface in cooperative action with the securing means, with a head surface of the pin member being flush with the outer surface and the exterior surface.

4. A fastener installation as claimed in claim 2, wherein further:
    the surface of the composite member is an exterior surface of the composite member opposite from the structure member; and,
    the head of the pin member further engages the exterior surface in cooperative action with the securing means.

5. A fastener installation as claimed in claim 1, wherein:
    a diameter of the bearing surface is less than a diameter of the cylindrically shaped opening;
    the diameter of the cylindrically shaped opening is greater than a diameter of the fastener bore;
    a shank of the pin member engages the shear member in bearing contact with the bearing surface;
    the shank is spaced from the composite member within the cylindrically shaped opening; and,
    the shank engages the structure member in bearing contact with the fastener bore.

6. A fastener installation as claimed in claim 5, wherein further:
    the surface of the composite member is a recess surface of an exterior surface of the composite member;
    a depth of the recess surface is selected such that an outer surface of the shear member is flush with the exterior surface; and,
    the cylindrically shaped opening extends through the composite member from the recess surface.

7. A fastener installation as claimed in claim 5, wherein further the surface of the composite member is an exterior surface of the composite member.

8. A fastener installation as claimed in claim 1 wherein the securing means comprises a nut member.

9. A fastener installation as claimed in claim 1 wherein the securing means comprises a threaded bore of the structure member in axial alignment with the fastener bore.

10. A fastener installation for securing a composite member to a structure, comprising:
    a shear member adhesively bonded to the composite member and having a bearing surface extending therethrough in general axial alignment with an opening extending through the composite member;
    a pin member extending through the shear member and the composite member, the pin member engaging the bearing surface in bearing contact and being spaced from the composite member within the opening; and,
    means for applying a compressive force to the composite member for securing the composite member to the structure whereby shear forces are transferred between the structure member and the composite member through the pin member engaging the bearing surface of the shear member while avoiding bearing contact between the pin member and the composite member.

11. A method for securing a composite member to a structure, comprising the steps of:
    forming a cylindrically shaped bearing surface extending through a shear member;
    forming a cylindrically shaped opening extending through the composite member at a location selected such that the cylindrically shaped opening is in general axial alignment with a cylindrically shaped fastener bore of a structure member upon proper positioning of the composite member in place for being secured to the structure;

adhesively bonding the shear member to a surface of the composite member, the bearing surface being bonded in general axial alignment with the cylindrically shaped opening;

positioning the composite member and the shear member bonded thereto in place for being secured to the structure, the bearing surface being in axial alignment with the fastener bore;

extending a pin member through the shear member and the composite member, the pin member engaging the shear member in bearing contact with the bearing surface and being, spaced from the composite member within the cylindrically shaped opening and further engaging the structure member in bearing contact with the fastener bore; and, engaging a securing means with an end of the pin member, the securing means applying compressive force to the composite member in cooperative action with a head of the pin member whereby shear forces are transferred between the structure member and the composite member through the pin member engaging the bearing surface of the shear member while avoiding bearing contact between the pin member and the composite member.

12. A method for securing a composite member to a structure as claimed in claim 11, wherein:

the bearing surface is formed having a diameter greater than a diameter of the cylindrically shaped opening;

the cylindrically shaped opening is formed having the diameter thereof greater than a diameter of the fastener bore;

the extending step engages the head of the pin member with the bearing surface; and, the extending step extends, a shank of the pin member through the cylindrically shaped opening spaced from the composite member, the shank further engaging the structure member in bearing contact with the fastener bore.

13. A method for securing a composite member to a structure as claimed in claim 12, further comprising the steps of:

forming a recess surface at the selected location in an exterior surface of the composite member selected to be opposite from the structure member upon positioning of the composite member in place for being secured to the structure;

forming a conical surface at, the selected location in general axial alignment with the cylindrically shaped opening and extending between the cylindrically shaped opening and the recess surface; wherein, a depth of the recess surface is selected such that an outer surface of the bonded shear member is flush with the exterior surface, the bonding step comprises adhesively bonding the shear member to the recess surface, and, the head of the pin member further engages the conical surface to apply compressive force to the composite member in cooperative action with the securing means, a head surface of the pin member being flush with the outer surface of the shear member and the exterior surface of the composite member.

14. A method for securing a composite member to a structure as claimed in claim 12, wherein:

the bonding step comprises adhesively bonding the shear member to an exterior surface of the composite member selected to be opposite from the structure member upon proper positioning of the composite member in place for being secured to the structure; and, the head of the pin member further engages the exterior surface to apply compressive force to the composite member in cooperative action with the securing means.

15. A method for securing a composite member to a structure as claimed in claim 11, wherein:

the bearing surface is formed having a diameter less than a diameter of the cylindrically shaped opening;

the cylindrically shaped opening is formed having the diameter thereof greater than a diameter of the fastener bore;

the extending step engages a shank of the pin member with the bearing surface; and, the extending step extends the shank of the pin member through the cylindrically shaped opening spaced from the composite member, the shank further engaging the structure member in bearing contact with the fastener bore.

16. A method for securing a composite member to a structure as claimed in claim 15, further comprising the step of forming a recess surface at the selected location in an exterior surface of the composite member, wherein:

the cylindrically shaped opening extends through the composite member to the recess surface, a depth of the recess surface is selected such that an outer surface of the bonded shear member is flush with the exterior surface, and the bonding step comprises adhesively bonding the shear member to the recess surface.

17. A method for securing a composite member to a structure as claimed in claim 15, wherein the bonding step comprises adhesively bonding the shear member to an exterior surface of the composite member.

18. A fastener installation as claimed in claim 11 wherein the securing means comprises a nut member.

19. A fastener installation as claimed in claim 11 wherein the securing means comprises a threaded bore of the structure member in axial alignment with the fastener bore.

20. A method for securing a composite member to a structure, comprising the steps of:

forming a bearing surface through a shear member;

forming a cylindrically shaped opening extending through the composite member;

bonding the shear member to the composite member, the bearing surface being in general axial alignment with the cylindrically shape opening;

positioning the composite member with the shear member bonded thereto for being secured to the structure;

extending a pin member through the shear member in bearing contact with the bearing surface and through the cylindrically shape opening spaced from the composite member; and, engaging a securing means with the pin member, the securing means acting in cooperation with a head of the pin member to apply a compressive force to the composite member whereby shear forces are transferred between a structure member and the composite member through the pin member engaging the bearing surface of the shear member while avoiding bearing contact between the pin member and the composite member.

* * * * *